(12) United States Patent
Ahmed (10) Patent No.: US 6,491,457 B2
(45) Date of Patent: Dec. 10, 2002

(54) APPARATUS AND METHOD FOR DERIVING ELECTRIC POWER EFFICIENTLY FROM A KEYBOARD

(76) Inventor: Adel Abdel Aziz Ahmed, 160 Ridgeview Cir., Princeton, NJ (US) 08540

( * ) Notice: Subject to any disclaimer, the term of this patent is extended or adjusted under 35 U.S.C. 154(b) by 0 days.

(21) Appl. No.: 09/748,946

(22) Filed: Dec. 27, 2000

(65) Prior Publication Data

US 2002/0009320 A1 Jan. 24, 2002

Related U.S. Application Data

(60) Provisional application No. 60/173,393, filed on Dec. 28, 1999.

(51) Int. Cl.[7] .................................................. B41J 5/08
(52) U.S. Cl. ................. 400/477; 400/474; 400/479; 400/479.1; 400/479.2; 400/472
(58) Field of Search ........................ 400/477, 472–490

(56) References Cited

U.S. PATENT DOCUMENTS 5,838,138 A * 11/1998 Henty ........................ 320/107
5,911,529 A 6/1999 Crisan ........................ 400/472

FOREIGN PATENT DOCUMENTS

JP 1-114334 * 5/1989 ................. 320/110

OTHER PUBLICATIONS

IBM Technical Disclosure Bulletin, "Cordless Keyboard with Electric Power Generator", vol. 36 No. 11, Nov. 1993, p 261–262.*

* cited by examiner

Primary Examiner—Andrew H. Hirshfeld
Assistant Examiner—Minh H. Chau (57) ABSTRACT

A keyboard apparatus has keys for operation by a user. The keyboard includes a first plurality of keys being coupled to electrical generator apparatus for generating electricity from their operation. A second plurality of the keys is not coupled to electrical generator apparatus. The first plurality of keys exhibits a greater average statistical frequency of usage per key than does the second plurality.

22 Claims, 7 Drawing Sheets

English Letter Usage using as a sample, _A Tale of Two Cities_
by Charles Dickens (with Roman Numeral chapter numbers removed)

Total letter count = 586747

Letter use frequencies:

| | | |
|---|---|---|
| E: | 72881 | 12.4% |
| T: | 52397 | 8.9% |
| A: | 47072 | 8.0% |
| O: | 45116 | 7.6% |
| N: | 41316 | 7.0% |
| I: | 39710 | 6.7% |
| H: | 38334 | 6.5% |
| S: | 36770 | 6.2% |
| R: | 35946 | 6.1% |
| D: | 27487 | 4.6% |
| L: | 21479 | 3.6% |
| U: | 16218 | 2.7% |
| M: | 14928 | 2.5% |
| W: | 13835 | 2.3% |
| C: | 13223 | 2.2% |
| F: | 13152 | 2.2% |
| G: | 12121 | 2.0% |
| Y: | 11849 | 2.0% |
| P: | 9452 | 1.6% |
| B: | 8163 | 1.3% |
| V: | 5044 | 0.8% |
| K: | 4631 | 0.7% |
| -: | 2327 | 0.3% |
| ': | 1168 | 0.1% |
| Q: | 655 | 0.1% |
| X: | 637 | 0.1% |
| J: | 623 | 0.1% |
| Z: | 213 | 0.0% |

FIG. 1

239502 total letters

| | | | | | |
|---|---|---|---|---|---|
| 038562 spc | .15706 | .15706 | 1 | 3.45% of total | 15.706% key |
| 024056 e | .09797 | .25503 | 2 | 6.90 | 9.8 |
| 018819 t | .07665 | .33168 | 3 | 10.3 | 7.7 |
| 017908 a | .07294 | .40462 | 4 | 13.8 | 7.3 |
| 016203 i | .06599 | .47061 | 5 | 17.2 | 6.6 |
| 016088 r | .06553 | .53614 | 6 | 20.7 | 6.6 |
| 013630 o | .05514 | .59128 | 7 | 24.1 | 5.5 |
| 013023 n | .05304 | .64432 | 8 | 27.6 | 5.3 |
| 011782 s | .04798 | .69230 | 9 | 31.0 | 4.8 |
| 008854 l | .03606 | .72836 | 10 | 34.5 | 3.6 |
| 008148 h | .03319 | .76155 | 11 | 37.9 | 3.3 |
| 007574 d | .03084 | .79239 | 12 | 41.4 | 3.1 |
| 007465 c | .03040 | .82279 | 13 | 44.8 | 3.0 |
| 006640 u | .02704 | .84983 | 14 | 48.3 | 2.7 |
| 005058 p | .02060 | .87043 | 15 | 51.7 | 2.1 |
| 004406 f | .01795 | .88838 | 16 | 55.2 | 1.8 |
| 004397 m | .01791 | .90629 | 17 | 58.6 | 1.8 |
| 003942 paraleft | .01606 | .92235 | 18 | 62.1 | 1.6 |
| 003400 g | .01385 | .93620 | 19 | 65.5 | 1.4 |
| 003098 w | .01262 | .94882 | 20 | 69.0 | 1.3 |
| 002869 y | .01169 | .96051 | 21 | 72.4 | 1.2 |
| 002765 periods | .01126 | .97177 | 22 | 75.9 | 1.1 |
| 002550 b | .01039 | .98216 | 23 | 79.3 | 1.0 |
| 001783 v | .00726 | .98942 | 24 | 82.8 | 0.7 |
| 001754 k | .00714 | .99656 | 25 | 86.2 | 0.7 |
| 000386 j | .00157 | .99813 | 26 | 89.7 | 0.2 |
| 000361 x | .00147 | .99960 | 27 | 93.1 | 0.1 |
| 000267 z | .00109 | 1.00069 | 28 | 96.6 | 0.1 |
| 000145 q | .00059 | 1.00128 | 29 | 100 | 0.06 | total characters 245521   total fractional sum: 1.00128

APPARATUS AND METHOD FOR DERIVING ELECTRIC POWER EFFICIENTLY FROM A KEYBOARD

CROSS-REFERENCE TO RELATED APPLICATIONS

Reference is hereby made to U.S. Provisional Application for Patent Ser. No. 60/173,393, filed Dec. 28, 1999 in the name of Adel A. Ahmed, the present inventor, for APPARATUS AND METHOD FOR DERIVING ELECTRIC POWER EFFICIENTLY FROM A KEYBOARD and whereof the disclosure is hereby incorporated by reference herein.

FIELD OF THE INVENTION

The present invention relates to the provision of electric power to portable electrical apparatus and, more specifically, to improved apparatus for deriving electrical power from a keyboard.

DESCRIPTION OF RELATED ART

U.S. Pat. No. 5,911,529, entitled TYPING POWER and issued Jun. 15, 1999 in the name of Crisan, discloses a keyboard power generator having a plurality of keys with one or more magnets mounted on them. A plurality of coils are mounted on both ends of the magnets such that, when a user is typing, the magnet traverses the coils. The movement of the magnet over the coils causes an electric current to be generated. Various detailed arrangements are described for harnessing the power of movement of the keys on the keyboard for providing electrical power.

The energy provided by the keyboard described by in U.S. Pat. No. 5,911,529 is stated to be usable to lengthen the operating period of a portable computer, or in the alternative, it can be used to reduce the size of the primary battery so as to result in a lighter portable computer. The disclosure of the afore-mentioned patent is herein incorporated by reference to the extent not incompatible with the present invention.

SUMMARY OF THE INVENTION

In accordance with another aspect of the invention, keyboard apparatus has keys for operation by a user. The keyboard comprises a first plurality of the keys being coupled to electrical generator apparatus for generating electricity from their operation; and a second plurality of said keys not being coupled to electrical generator apparatus. Keys exhibiting a relatively high usage rate are included in the first plurality of keys and keys exhibiting a relatively low usage rate are left in the second plurality.

In accordance with an aspect of the invention, a keyboard apparatus having keys for operation by a user comprises a first plurality of the keys being coupled to electrical generator apparatus for generating electricity from their operation; and a second plurality of the keys not being coupled to electrical generator apparatus, the first plurality of keys exhibiting a greater average statistical frequency of usage per key than the second plurality.

In accordance with the principles of the present invention, a considerable saving can be effected by equipping for electric power generation only a portion, appropriately selected, of the total number of keys on a keyboard because of the diminishing return on equipping little-used keys for power generation.

In accordance with another aspect of the invention, the first plurality includes the two most frequently used keys based on statistics for a language for which the keyboard is to be used.

In accordance with another aspect of the invention, the first plurality includes the three most frequently used keys based on statistics for a language for which the keyboard is to be used.

In accordance with another aspect of the invention, the first plurality includes the four most frequently used keys based on statistics for a language for which the keyboard is to be used.

In accordance with another aspect of the invention, the first plurality includes the N most frequently used keys based on statistics for a language for which the keyboard is to be used, where N is determined by design choice.

In accordance with another aspect of the invention, the first plurality includes the N most frequently used keys based on statistics for a language for which the keyboard is primarily intended to be used, where N is determined by design choice.

In accordance with another aspect of the invention, in a keyboard apparatus having keys for operation by a user, the keyboard comprises a key exhibiting the greatest average statistical frequency of usage of the keys, wherein that key is coupled to electrical generator apparatus for generating electricity from its operation; and the balance of the keys are not being coupled to electrical generator apparatus.

In accordance with another aspect of the invention, a keyboard apparatus comprises a plurality of keys for operation by a user, the keyboard comprising electrical power generation apparatus for generating electrical power from mechanical energy associated with operation of keys coupled thereto; a first plurality of the keys, herein referred to as generator keys, being coupled to the electrical power generation apparatus and exhibiting a first total relative statistical frequency of usage; a second plurality of the keys, herein referred to as non-generator keys, not being coupled to the electrical power generation apparatus and exhibiting a second total relative statistical frequency of usage; the number of generator keys divided by the number of non-generator keys forming a first ratio; the first total relative statistical frequency of usage of the generator keys divided by the second total relative statistical frequency of usage of the non-generator keys forming a second ratio; and the first ratio being smaller than the second ratio.

In accordance with another aspect of the invention, the first and second relative statistical frequencies of usage are determined by observation from text samples in a language for which the keyboard is primarily intended to be used.

In accordance with another aspect of the invention, the first and second relative statistical frequencies of usage are determined by observation from text samples in the English language.

In accordance with another aspect of the invention, a keyboard apparatus includes a plurality of keys for operation by a user, the keyboard comprising a first plurality of the keys which are coupled to electrical generator apparatus for generating electricity from their operation; and a second plurality of the keys not being coupled to electrical generator apparatus, the first plurality of keys exhibiting a total statistically greater frequency of usage than the second plurality.

In accordance with another aspect of the invention, a keyboard apparatus includes a given total number of keys for operation by a user. The keyboard comprises electrical generator apparatus for generating electricity from operation of keys, a first plurality of the keys being coupled to the electrical generator, the balance of the total number of keys, not being coupled to electrical generator apparatus. The first plurality of keys exhibits a first total relative statistical frequency of usage; the balance of the total number of keys exhibits a second total relative statistical frequency of usage; and the first total relative statistical frequency of usage is greater than the second.

In accordance with another aspect of the invention, a method for generating electrical power from a keyboard, comprises the steps of: determining a statistical frequency of usage for keys of the keyboard; forming a first group of keys having a given total statistical frequency of usage; forming a second group of keys having a total statistical frequency of usage less than the given total statistical frequency of usage; and coupling keys of only the first group to electrical generator apparatus for generating electricity from operation of such keys.

In accordance with another aspect of the invention, a method for generating electrical power from a keyboard, comprises the steps of: determining a statistical frequency of usage for keys of the keyboard; forming a first group of keys having a first average statistical frequency of usage per key; forming a second group of keys having a second average statistical frequency of usage per key that is less than the first average statistical frequency of usage per key; and coupling keys of only the first group to electrical generator apparatus for generating electricity from operation of such keys.

In accordance with another aspect of the invention, a keyboard apparatus having a given total number of keys for operation by a user, the keyboard comprising: electrical generator apparatus for generating electricity from operation of keys; a first plurality of the keys being coupled to the electrical generator; the balance of the total number of keys, not being coupled to electrical generator apparatus; the first plurality of keys exhibiting a first total relative statistical frequency of usage; the balance of the total number of keys exhibiting a second total relative statistical frequency of usage; the first and the second total relative statistical frequencies of usage being in a ratio to one another; and wherein the ratio is based on a design choice.

In accordance with another aspect of the invention, the ratio is determined based on a balancing of the increased cost of including more keys in the first plurality of keys against the benefit of a greater amount of power generation.

BRIEF DESCRIPTION OF THE DRAWINGS

The invention will be more fully understood from the following detailed description of preferred embodiments in conjunction with the drawing, in which.

DETAILED DESCRIPTION OF THE INVENTION

It is herein recognized that the most economical allocation of resources in equipping keys on a keyboard for the generation of electrical power is not necessarily to so equip all keys or an arbitrary portion of the keyboard keys.

It is also herein recognized that, in a given language for which the keyboard may be primarily intended, such as, for example, the English language, there are statistical differences between the usage frequencies of the various letters. Indeed, this was recognized early by Morse in allocating telegraphic symbols to the letters of the alphabet, wherein the shortest signs were given to the most frequently letters, E being the shortest and letters such as Q, Y, and Z being allocated relatively longer symbols, so as to tend to reduce the total occupancy time of a telegraph link for a given message.

It is also herein recognized that equipping certain little-used keys with electric power generation apparatus in the manner described by Crisan is not economical and, on the other, some non-letter keys, such as the frequently-used space-bar may be worth including along with frequently used letters for equipping with electric power generation apparatus.

In accordance with the present invention, a determination is made on the basis of cost and return as to which keys should be equipped for electric power generation in the manner disclosed by Crisan, and which keys on the keyboard contribute so little that they need not be equipped for such power generation, on the basis of statistical frequency of usage information.

Figure 1:
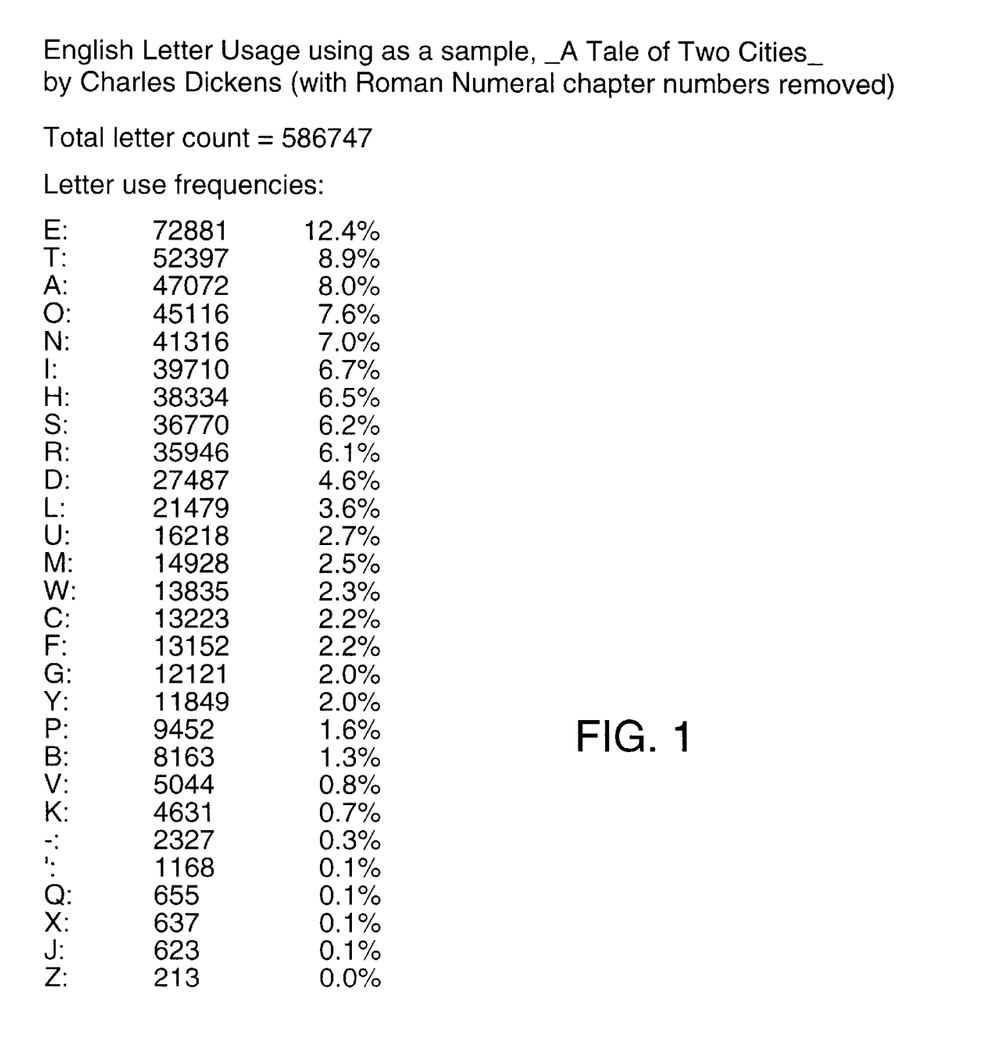
FIGS. 1 and 2 show, by way of example, the frequency of usage observed experimentally in an arbitrarily selected passage in the English language, as is helpful to an understanding of the invention.
Figure 2:
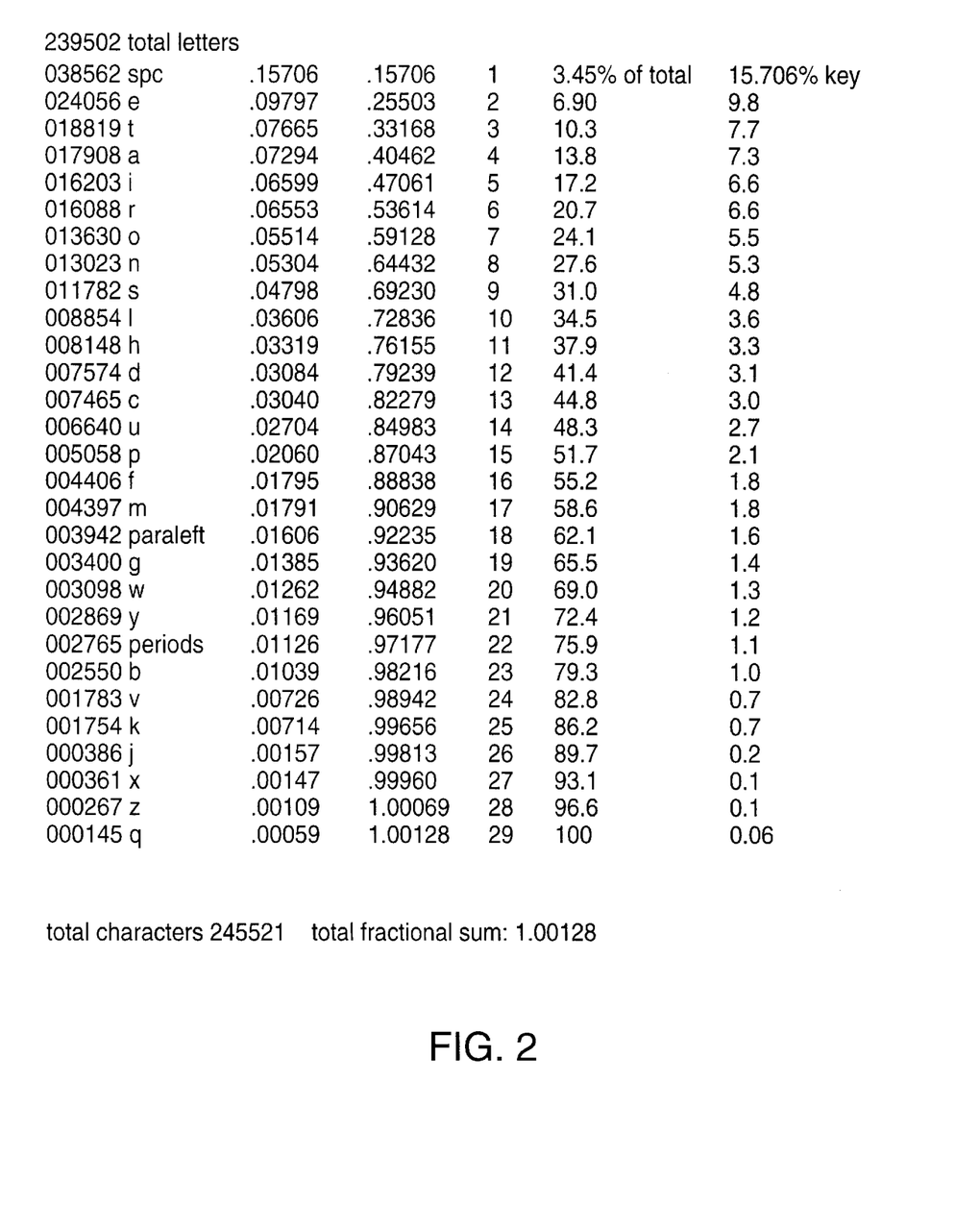
Figure 3:
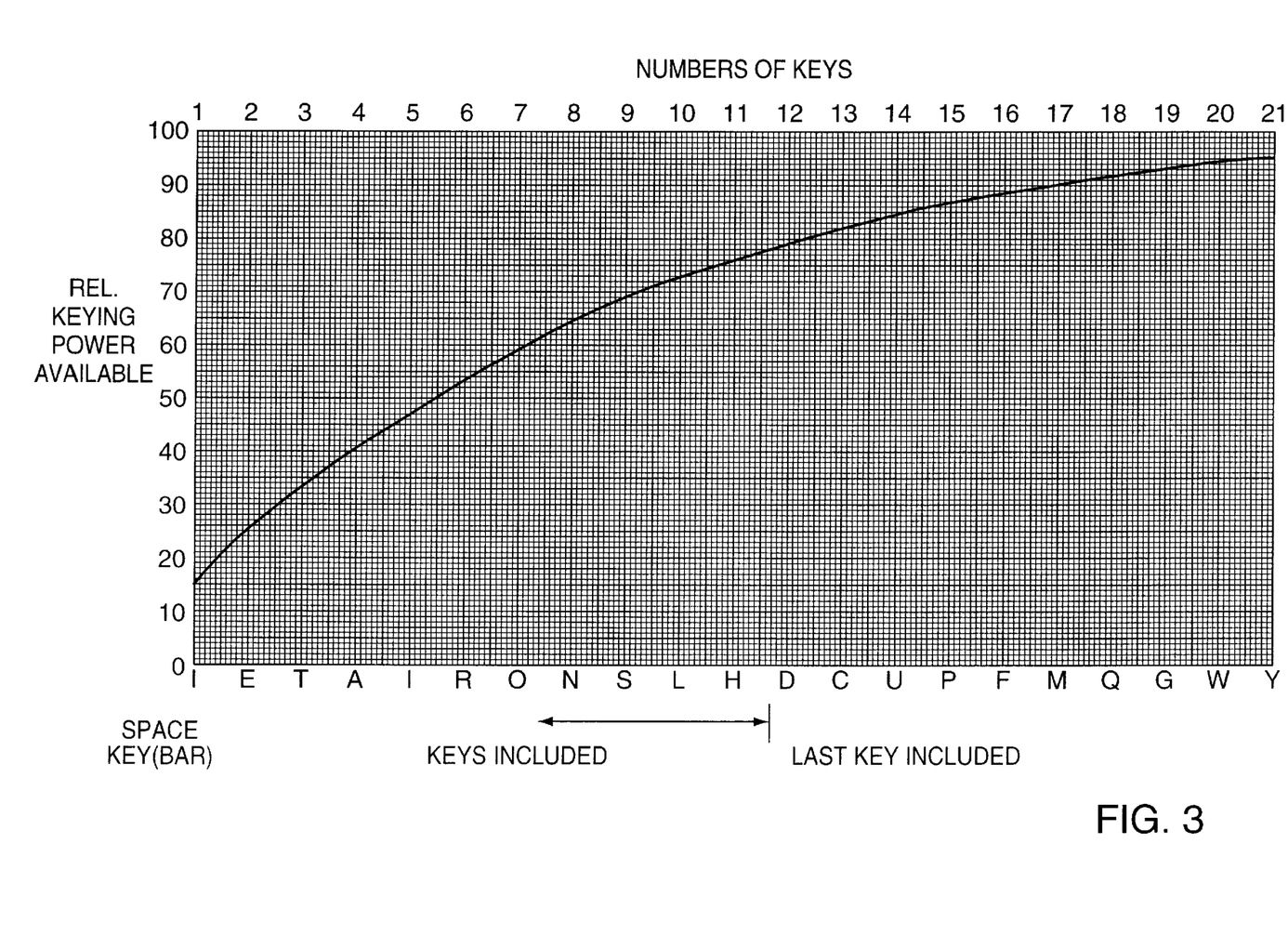
FIG. 3 shows, by way of example, a graph with letters of the alphabet along the abscissa, arranged in decreasing statistical order of frequency of usage, as is helpful to an understanding of the invention.

FIGS. 1 and 2 show, by way of example, the frequency of usage observed experimentally in an arbitrarily selected passage in the English language. These figures are merely given here to indicate the general trend and need not be very precise or representative of a wide spectrum of English language statistics and are sufficient to explain the principles and advantages of the present invention. If need be, more exact figures can be obtained and substituted for the statistics used herein. FIG. 3 shows, by way of example, a graph with letters of the alphabet along the abscissa, arranged in decreasing statistical order of frequency of usage. Relative percentage keying power available is plotted on the ordinate scale, up to 100%. The curve relates the percentage power available to the number of keys equipped for electric power generation, beginning with the space bar key on the left as the first key, followed by the letter E and so forth. It is seen that approximately 70% of the total available keying power is obtained by equipping only 9 keys, up to and including the letter S. Furthermore, 80% of the possible total power is already achieved by equipping just 13 keys for power generation. The foregoing numbers are approximate and are based on the exemplary statistical or average relative frequency of use herein indicated. With other statistical information such as may be derived from other samples or from historical data, the results may differ a little from these results, though not by any very significant amount.

Figure 4:
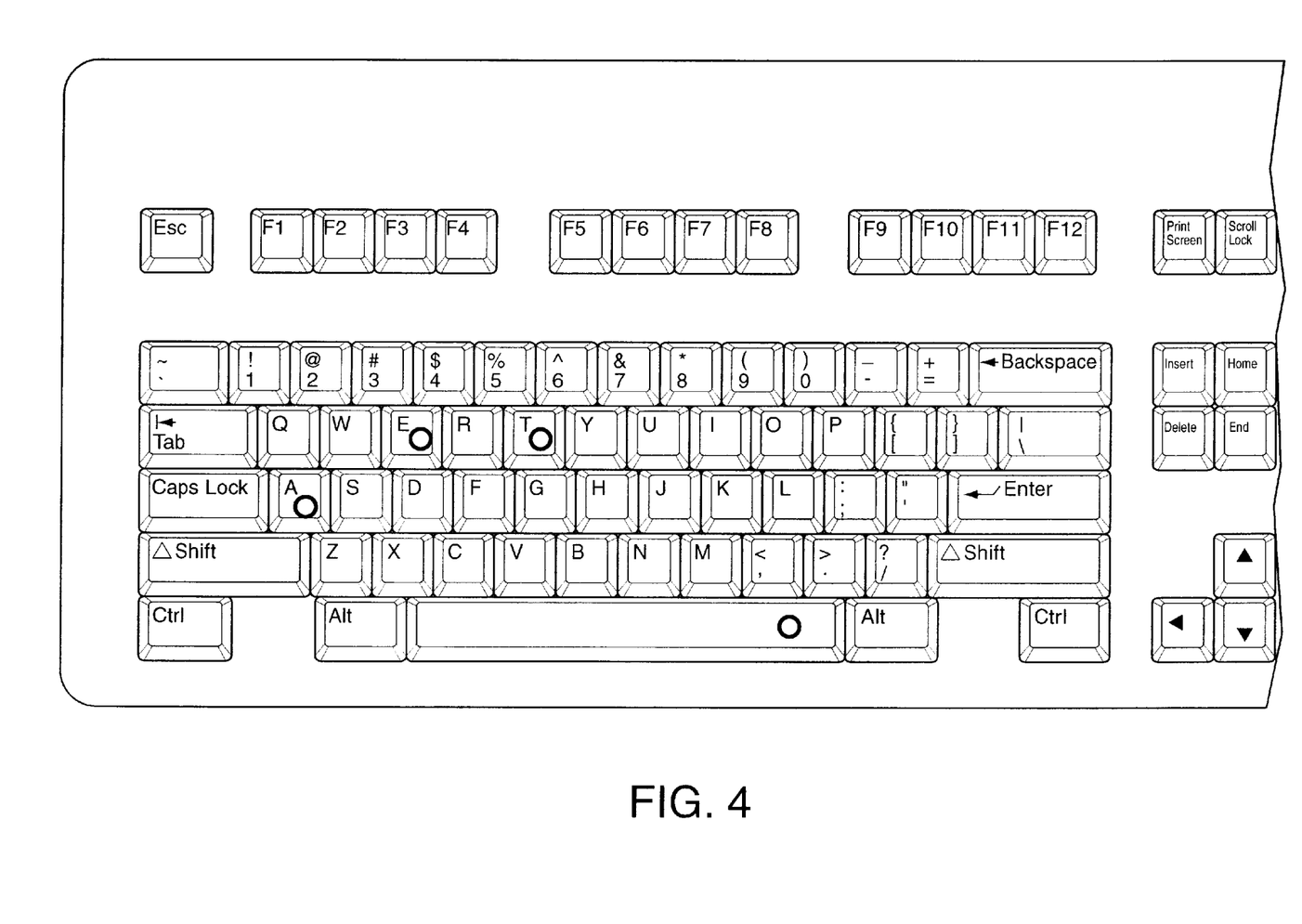
FIGS. 4–7 show a keyboard with various keys marked with a black dot or bullet to indicate a key equipped coupled to electrical generating apparatus, in accordance with the principles of the invention.

FIG. 4 shows a typical keyboard with certain keys, namely the [space-bar], E, T, and A, marked with black dots to indicate that these keys are coupled to electrical generating apparatus for generating electrical power whereas unmarked keys are not. Based on the exemplary statistics for English language text referred to above, this arrangement of 4 generator keys will, on average, produce in the vicinity of 40% of the power that would be produced were substantially all the keys under consideration to be so equipped.

Figure 5:
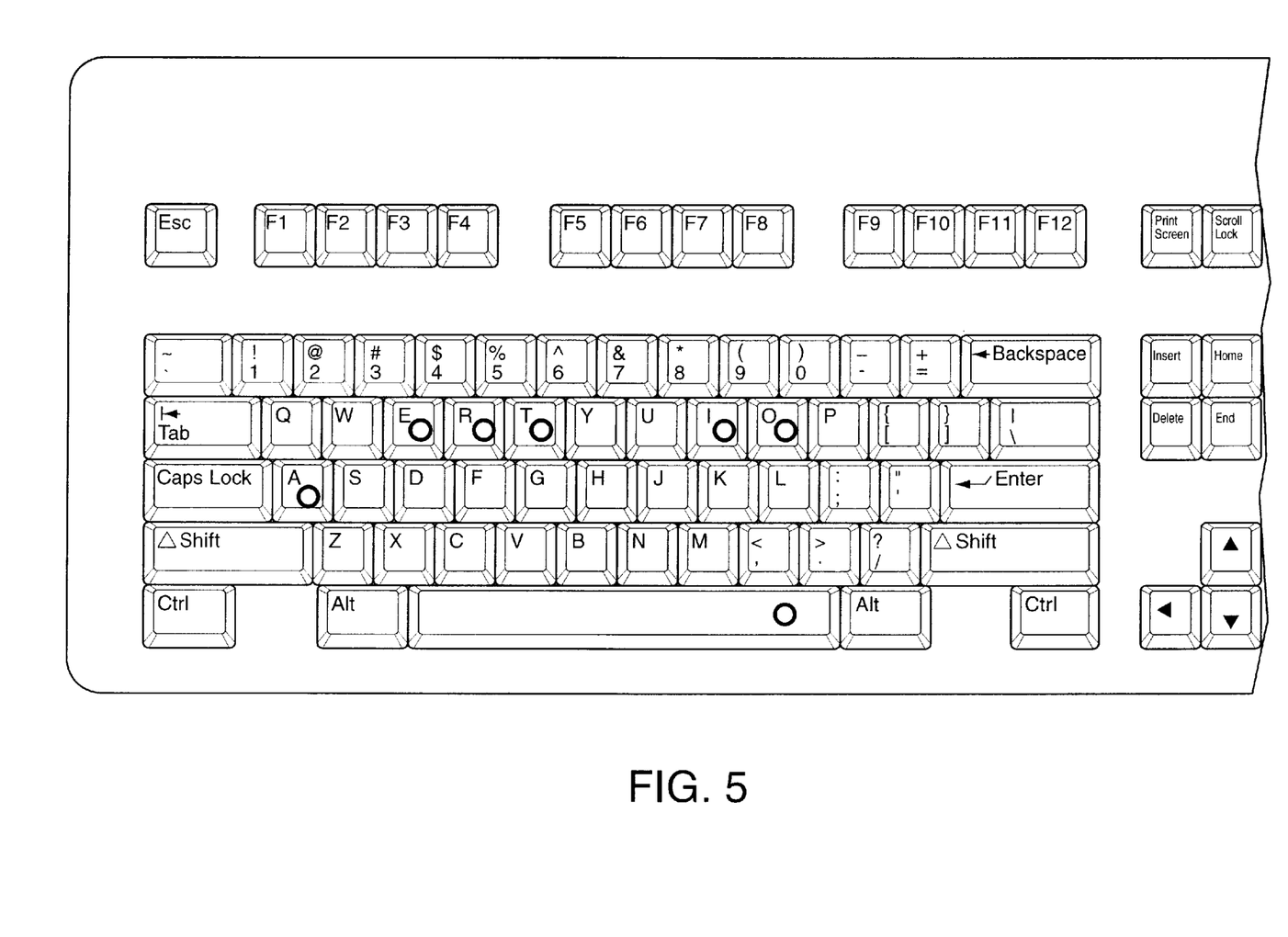

Similarly, FIG. 5 shows 7 highest usage keys being coupled to electrical generating for power generation: [spacebar] E, T, A, I, R, and O, by which about 58% power is obtainable, in accordance with the present invention.

Figure 6:
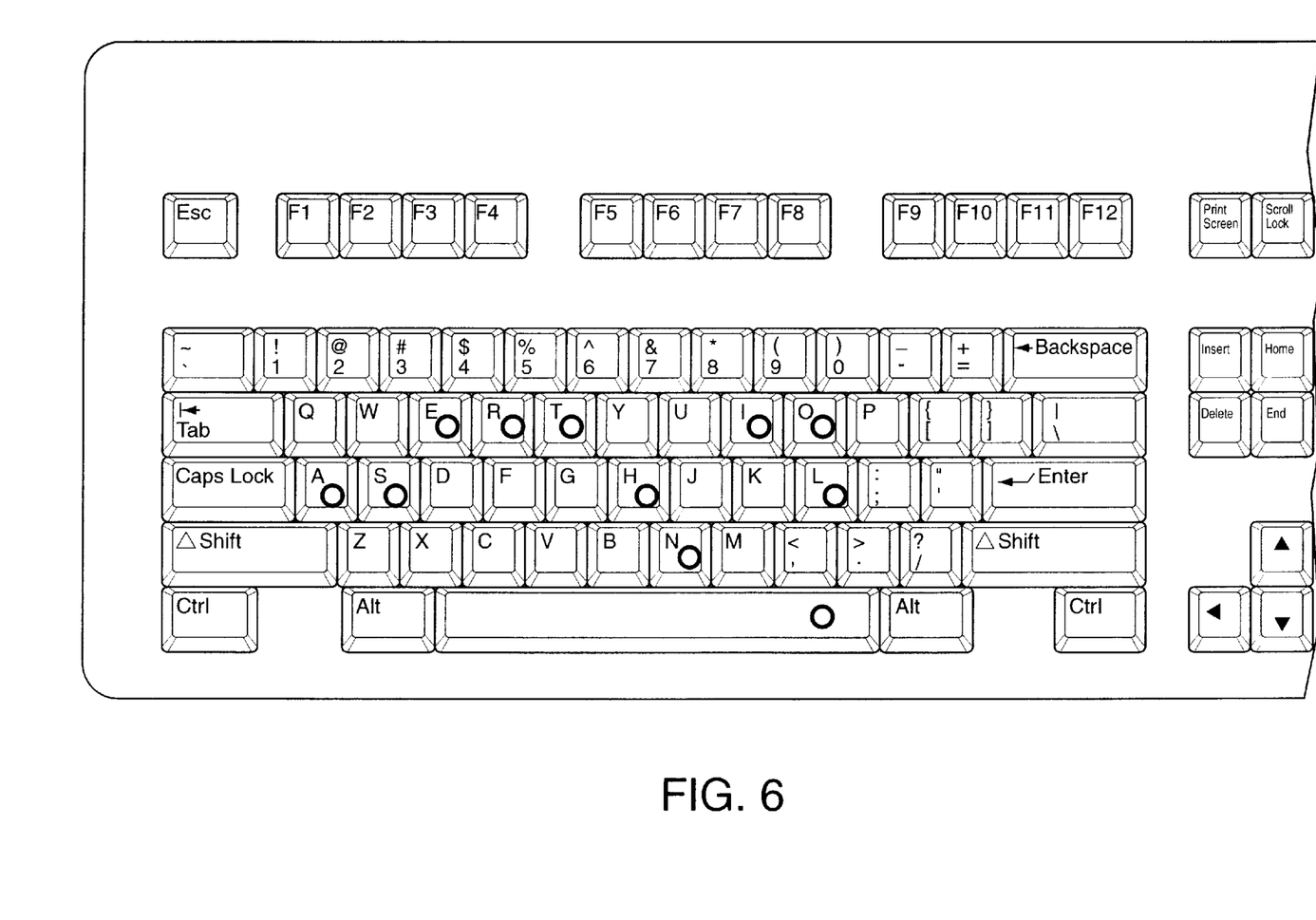

FIG. 6 shows 11 highest usage keys being used for power generation: [spacebar] E, T, A, I, R, O, N, S, L, and H by which about 72% power is obtainable, in accordance with the present invention.

Figure 7:
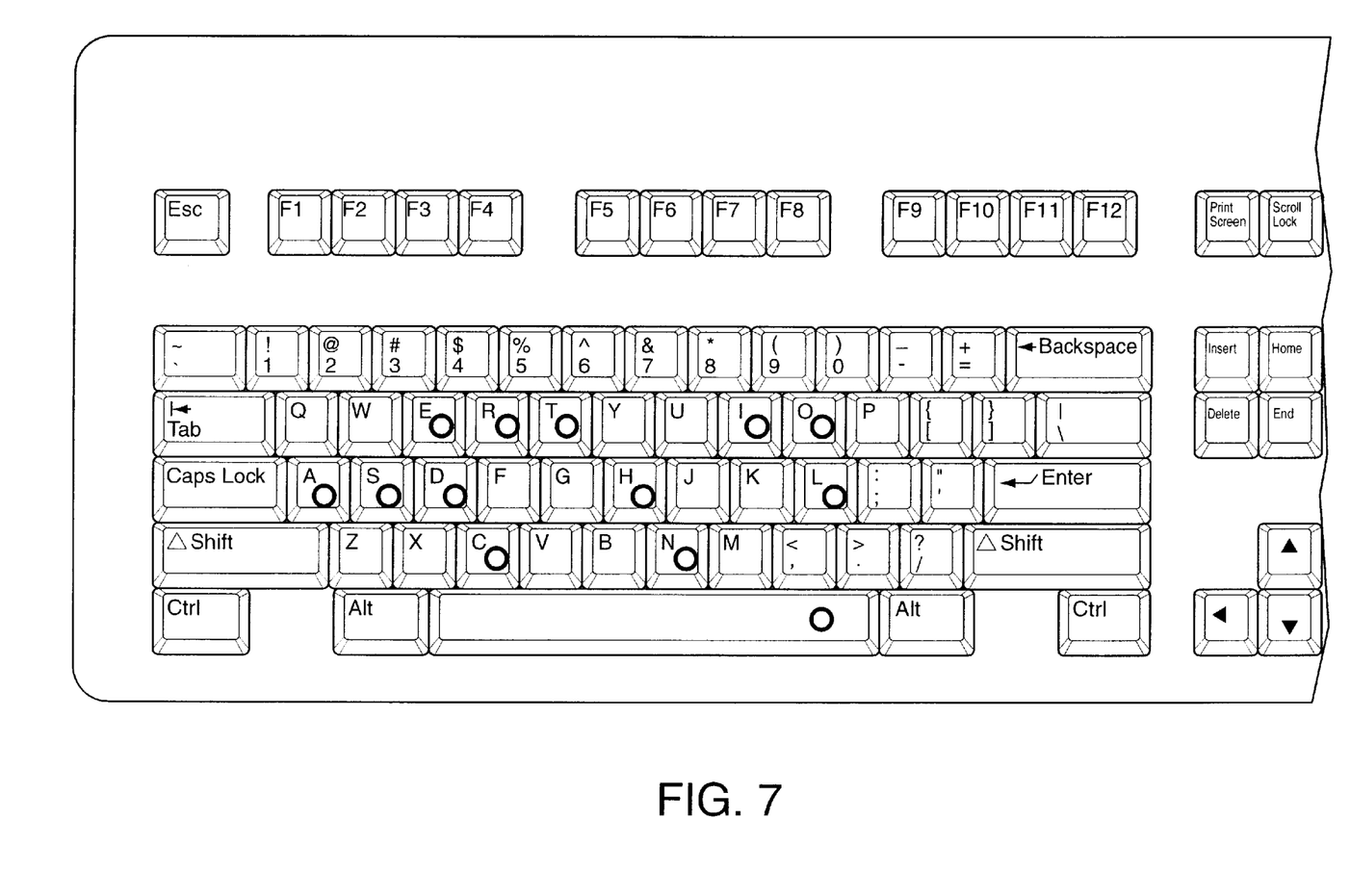

FIG. 7 shows 13 high usage keys used for power generation: [spacebar], E, T, A, I, R, O, N, S, L, H, D, and C, by which about 82% power is obtainable, in accordance with the present invention.

The economy of generating apparatus with a small number of keys selected in accordance with the invention is thus evident, as is also the diminishing return gained by going to a large number of keys.

In accordance with an embodiment of the present invention, a selection of keys for generation of power is made with the guidance of the statistical usage data for the language under consideration. For example, one might settle for 80% of the possible energy generation. In accordance with the exemplary graph of FIG. 3, this means the inclusion of the following set for power generation: ([Space bar], E, T, A, I, R, O, N, S, L, H, D)

Thus about 80% of the possible power is achieved with just 12 keys being coupled for power generation.

The exact choice of statistical information to use in allocating generator keys is not critical to the invention: only that certain keys are statistically more efficient in utilizing their associated generator apparatus and that certain keys should be left out for greater economy is significant.

However, in practice, the additional cost of including a key as a generator key as compared with a non-generator key as one factor will be weighed against the advantage of more or less electrical power generation in the keyboard apparatus. The additional cost will depend on such factors as the type of generator utilized, whether there is an advantage in grouping certain keys together because of row and/or column proximity and so forth. The advantage will typically include considerations of selling points, a lower selling price, customer satisfaction, and so forth. Accordingly, a point will be found on the curve of keys included that will provide desired conditions. However the selection of keys for power generation will generally comply with the principle of preferentially using the keys with the most usage, in accordance with the priniciples of the present invention.

It is contemplated that embodiments used for equipping the keyboard keys for the generation of electrical power can include any of the power generation arrangements described by Crisan in the aforementioned patent, including electromagnetic induction generators, piezoelectric generators, and any other equivalent means for converting motion to a small electrical current.

While the invention has been described by way of exemplary embodiments, it will be understood by one of skill in the art to which it pertains that various changes and modification can be made without departing from the spirit of the invention. Thus, for example, depending on the type of language, such as technical English as compared with, say, legal English, the key usage may differ and thus the frequency of usage of certain letters or numerals may be different. Also, it may be convenient to group the generator function for keys together in a certain manner which may provide an advantage for certain types of power generation. These and like changes are intended to be within the scope of the invention, which is defined by the claims following.

What is claimed is:

1. A keyboard apparatus having keys for operation by a user, said keyboard comprising:
   a first plurality of said keys being coupled to electrical generator apparatus for generating electricity from their operation; and
   a second plurality of said keys not being coupled to electrical generator apparatus; and
   said first plurality of keys exhibiting a greater average statistical frequency of usage per key than said second plurality.

2. A keyboard apparatus as recited in claim 1, wherein said first plurality includes the two most frequently used keys based on statistics for a language for which said keyboard is to be used.

3. A keyboard apparatus as recited in claim 1, wherein said first plurality includes the three most frequently used keys based on statistics for a language for which said keyboard is to be used.

4. A keyboard apparatus as recited in claim 3, wherein said first plurality includes the N most frequently used keys based on statistics for a language for which said keyboard is primarily intended to be used, where N is determined by design choice.

5. A keyboard apparatus as recited in claim 1, wherein said first plurality includes the four most frequently used keys based on statistics for a language for which said keyboard is to be used.

6. A keyboard apparatus as recited in claim 1, wherein said first plurality includes the five most frequently used keys based on statistics for a language for which said keyboard is to be used.

7. A keyboard apparatus as recited in claim 1, wherein said first plurality includes the six most frequently used keys based on statistics for a language for which said keyboard is to be used.

8. A keyboard apparatus as recited in claim 1, wherein said first plurality includes the seven most frequently used keys based on statistics for a language for which said keyboard is to be used.

9. A keyboard apparatus as recited in claim 1, wherein said first plurality includes the ten most frequently used keys based on statistics for a language for which said keyboard is to be used.

10. A keyboard apparatus as recited in claim 1, wherein said first plurality includes the N most frequently used keys based on statistics for a language for which said keyboard is to be used, where N is determined by design choice.

11. A keyboard apparatus as recited in claim 1 wherein said first and second relative statistical frequencies of usage are determined by observation from text samples in the English language.

12. A keyboard apparatus having keys for operation by a user, said keyboard comprising:
   a key exhibiting the greatest average statistical frequency of usage of said keys, said key being coupled to electrical generator apparatus for generating electricity from its operation; and
   the balance of said keys not being coupled to electrical generator apparatus.

13. A keyboard apparatus having a plurality of keys for operation by a user, said keyboard comprising:
   electrical power generation apparatus for generating electrical power from mechanical energy associated with operation of keys coupled thereto;
   a first plurality of said keys, herein referred to as generator keys, being coupled to said electrical power generation apparatus and exhibiting a first total relative statistical frequency of usage;
   a second plurality of said keys, herein referred to as non-generator keys, not being coupled to said electrical power generation apparatus and exhibiting a second total relative statistical frequency of usage;

said number of generator keys divided by said number of non-generator keys forming a first ratio;

said first total relative statistical frequency of usage of said generator keys divided by said second total relative statistical frequency of usage of said non-generator keys forming a second ratio; and said first ratio being smaller than said second ratio.

14. A keyboard apparatus as recited in claim 13 wherein said first and second relative statistical frequencies of usage are determined by observation from text samples in a language for which said keyboard is primarily intended to be used.

15. A keyboard apparatus having a plurality of keys for operation by a user, said keyboard comprising:

a first plurality of said keys are coupled to electrical generator apparatus for generating electricity from their operation; and a second plurality of said keys are not coupled to electrical generator apparatus, said first plurality of keys exhibiting a total statistically greater frequency of usage than said second plurality.

16. A keyboard apparatus having a given total number of keys for operation by a user, said keyboard comprising:

electrical generator apparatus for generating electricity from operation of keys;

a first plurality of said keys being coupled to said electrical generator;

the balance of said total number of keys, not being coupled to electrical generator apparatus;

said first plurality of keys exhibiting a first total relative statistical frequency of usage;

said balance of said total number of keys exhibiting a second total relative statistical frequency of usage; and said first total relative statistical frequency of usage being greater than said second.

17. A method for generating electrical power from a keyboard, comprises the steps of:

determining a statistical frequency of usage for keys of said keyboard;

forming a first group of keys having a given total statistical frequency of usage;

forming a second group of keys having a total statistical frequency of usage less than said given total statistical frequency of usage; and coupling keys of only said first group to electrical generator apparatus for generating electricity from operation of such keys.

18. A method for generating electrical power from a keyboard, comprises the steps of determining a statistical frequency of usage for keys of said keyboard;

forming a first group of keys having a first average statistical frequency of usage per key;

forming a second group of keys having a second average statistical frequency of usage per key that is less than said first average statistical frequency of usage per key; and coupling keys of only said first group to electrical generator apparatus for generating electricity from operation of such keys.

19. A keyboard apparatus having a given total number of keys for operation by a user, said keyboard comprising:

electrical generator apparatus for generating electricity from operation of keys;

a first plurality of said keys being coupled to said electrical generator;

the balance of said total number of keys, not being coupled to electrical generator apparatus;

said first plurality of keys exhibiting a first total relative statistical frequency of usage;

said balance of said total number of keys exhibiting a second total relative statistical frequency of usage;

said first and said second total relative statistical frequencies of usage being in a ratio to one another; and wherein said ratio is based on a design choice.

20. A keyboard apparatus in accordance with claim 19, wherein said ratio is determined based on a balancing of the increased cost of including more keys in said first plurality of keys against the benefit of a greater amount of power generation.

21. A keyboard apparatus having keys for operation by a user, said keyboard comprising:

a first plurality of said keys being coupled to electrical generator apparatus for generating electricity from their operation; and a second plurality of said keys not being coupled to electrical generator apparatus; and wherein keys exhibiting a relatively high usage rate are included in said first plurality of keys and keys exhibiting a relatively low usage rate are included in said second plurality.

22. A keyboard apparatus having keys for operation by a user, said keyboard comprising:

a space bar being coupled to electrical generator apparatus for generating electricity from its operation; and no other keys being coupled to electrical generator apparatus.

* * * * *